Figure 1:
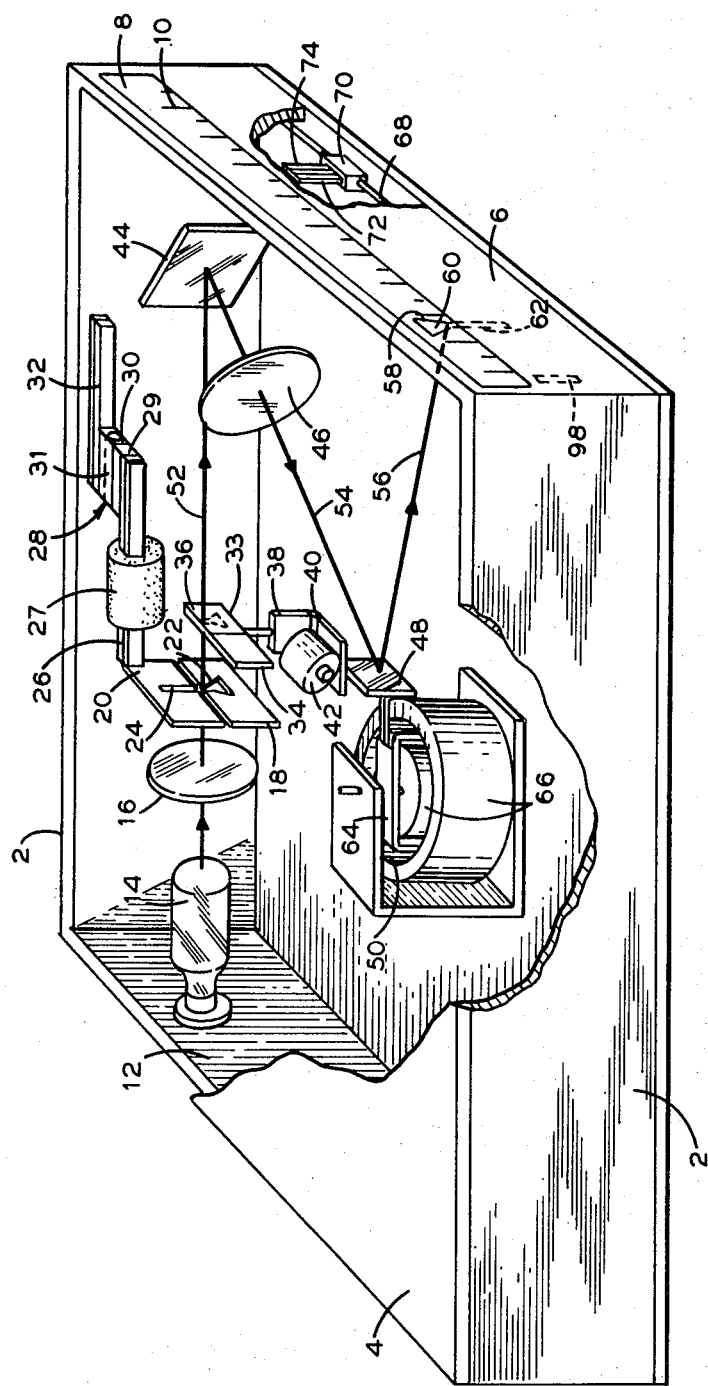

United States Patent
Dumast et al.

[15] 3,693,022
[45] Sept. 19, 1972

[54] REGULATOR-METER UTILIZING A BEAM OF LIGHT FOR INDICATION AND REGULATION

[72] Inventors: Michel Dumast, Pantin; Guy Rouzaud, Fontenay-aux-Roses; Luc Thevenin, Corneilles-en-Parisis, all of France

[73] Assignee: Societe D'Instrumentation Schlumberger, Paris, France

[22] Filed: Sept. 3, 1970

[21] Appl. No.: 69,294

Related U.S. Application Data

[62] Division of Ser. No. 841,695, July 14, 1969, Pat. No. 3,606,151.

[52] U.S. Cl. ..................250/230, 250/231, 324/97
[51] Int. Cl. ...............................................G01d 5/30
[58] Field of Search ...250/230, 231; 236/69; 324/96, 324/97, 110; 317/127; 340/266, 15.5

[56] References Cited

UNITED STATES PATENTS

| | | | |
|---|---|---|---|
| 3,271,677 | 9/1966 | Peter | 250/230 X |
| 3,271,754 | 9/1966 | Corbell | 250/230 X |
| 3,025,038 | 3/1962 | McDuffie | 250/230 |
| 3,054,928 | 9/1962 | Schrenk | 250/231 |
| 3,028,503 | 4/1962 | Stevenson | 250/231 |
| 3,337,739 | 8/1967 | Sendro | 250/231 |
| 3,309,498 | 3/1967 | Nagy | 250/231 |
| 3,349,245 | 10/1967 | Hosker | 250/231 |

*Primary Examiner*—James W. Lawrence
*Assistant Examiner*—D. C. Nelms
*Attorney*—William R. Sherman

[57] ABSTRACT

Regulator-meter apparatus includes signal-responsive meter mechanism for projecting a light spot onto a transparent screen such that the spot traverses the screen during signal-caused movement of the mechanism. The position of the spot on the screen is detected by two photosensitive elements which define one set point for the regulator portion of the apparatus, the elements being spaced apart a distance slightly greater than the corresponding cross-sectional dimensions of the spot and having the outputs thereof connected to different ones of the set and reset inputs of a bistable multivibrator. The bistable assumes either its set or reset state depending upon the position of the spot relative to the elements. Circuitry is provided for effecting initial full-scale energization and de-energization of the mechanism, causing the bistable to assume a known initial state, for example, the reset state. The cross-sectional shape of the spot is defined by a suitably apertured mask, mounted so as to be responsive to the displacements of both a proportional-effect and an integral-effect bimetallic element.

3 Claims, 2 Drawing Figures

PATENTED SEP 19 1972

3,693,022

SHEET 1 OF 2

INVENTORS
Michel Dumast
Guy Rouzaud
Luc Thevenin

REGULATOR-METER UTILIZING A BEAM OF LIGHT FOR INDICATION AND REGULATION

This application is a division of U.S. application Ser. No. 841,695, filed July 14, 1969 now U.S. Pat. No. 3,606,151.

This invention relates to control apparatus and more particularly to a regulator-meter for measuring and controlling the temperature of industrial equipment, such as an oven.

Regulator-meters for controlling industrial equipment typically measure a parameter such as temperature, pressure or flow and maintain this parameter in the vicinity of some predetermined value or set point. These regulators are often used to control ovens and the like in which the temperature must be held substantially constant and equal to some predetermined value.

The meter portion of the regulator-meter generally includes a galvanometer to which is applied a voltage proportional to the parameter to be measured. The moving coil of the galvanometer drives a pointer, which typically mounts a flag or mask at the free end thereof; the mask moving along a front scale bearing suitable indicia upon rotation of the pointer. A detecting system gives a "yes-or-no" signal according to whether the position of the flag is to the left or to the right of the set point. This signal actuates a relay which may be considered as part of the regulator portion of the regulator-meter by reason of its more direct interface with the means for regulating an associated apparatus (an oven, for example). Various conventional types of systems, which may be photoelectric, capacitative or indicative in nature are currently used to detect the position of the flag. French Pat. No. 1,330,847, is exemplary of a system which is basically indicative in nature in that it employs a metallic flag movable between two oscillating coils placed at the set point to change the LC time constant and hence the frequency of coil oscillation. A change in coil frequency is detected to provide an indication of the position of the flag.

However, disadvantageously these pointer systems are relatively fragile and since the pointers rotate about a central axis, usually require arcuate front scales. Furthermore, the pointer and the flag have a relatively high inertia which reduces the speed or response of the galvanometer.

Projected-light type meters, on the other hand, do not have such disadvantages. Instead of employing mechanical pointers, projected light meters commonly use a light spot, that is, a concentrated beam of light, reflected from a mirror mounted to rotate with the moving coil of the galvanometer. Unfortunately, the use of a light spot for regulation purposes gives rise to numerous problems. One such problem is that although it is a relatively simple matter to detect the passage of the spot at the set point, for example, by means of a photoelectric cell located at the set point, it is a far more difficult proposition to determine if this light spot is to the right or to the left of the set point after movement.

Further, for the meter to be wholly reliable, it is also necessary to provide numerous safety measures. For example, should there be a failure of the lamp filament, momentary failure of the power supply or breakage of the sensor associated with the controlled equipment, the regulator must react so as not to give erroneous commands which might damage the equipment. These problems, which did not occur with a moving vane, have not been satisfactorily solved for meters employing moving light spots.

An object of the invention is to provide a regulator-meter without the disadvantages mentioned hereinabove, using a light spot both for indication and regulation.

Another object of the invention is to provide a regulator-meter including a simple light spot detection system which allows one to know at any time, if the light spot is to the right or to the left of a set point.

A still further object of the invention is to provide a regulator-meter utilizing a movable light spot rather than a movable pointer, with all the safety features needed for reliable operation.

According to the instant invention, a regulator-meter includes a mirror galvanometer for projecting a light spot onto a transparent screen, the light spot traversing the screen along a defined path upon rotation of the mirror. The position of the light spot is detected by two photoelectric elements which are located along the path of the spot. Two such elements define one of the regulator set points. The outputs of these two cells are respectively connected to the set and reset inputs of a bistable device. The bistable takes either one or the other of two corresponding stable states when the light spot is resting on one side or the other of the cell photosensitive element. A sweeping or full-scale electrical signal is applied to and then removed from the galvanometer when the unit is switched on initially in order to trigger the bistable so that it always assumes the same initial state, for example, the reset state.

It is also known in the prior art to transform an operating regulator-meter, which may be described as a "yes-no" or "go-no go" type, into a proportional effect regulator by using a modulating bimetallic element heated simultaneously by an intervening component, such as a motor, heating resistor or pump. The oscillations of the regulated parameter around its set point are then considerably reduced. In practice, the proportional effect bimetallic element moves the set point so that the regulator oscillates about an average frequency which determines the proportional regulation range. Such a control for a temperature-regulated oven is especially typical.

In the proportional regulation range, heating of the oven and of the bimetallic element is established during intervals, the duration and frequency of which depend upon the amount and speed of deflection of the bimetallic element and on the heating and cooling speeds of the oven. Generally speaking, the extreme points of the sweeping range of the bimetallic element are designated to be symmetrical relative to the set point. Fast heating ovens stabilize at a temperature very close to the upper limit of the regulation range and hence the effective heating time intervals are very short, at least compared to the oven-cooling time constant. Slow heating ovens, on the contrary, stabilize at a temperature close to the lower limit of the proportional regulation range, the effective heating time intervals being interrupted only for a short time. Between these two extreme cases, all intermediate cases are, of course, possible.

To cancel the permanent systematic error due to proportional effect regulators, it is known to add an integral correction system. An integral correction bimetallic element may be used, the heating and cooling time constants of this second bimetallic element being generally comparable to those of the oven and, in any case, long compared to the constants of the proportional effect bimetallic element. Such systems are described, for example, in French Pat. Nos. 1,222,293 and 1,223,299. The effects of proportional and integral effect bimetallic elements are opposed and inasmuch as the integral action bimetallic element integrates the successive heating intervals given by the modulation bimetallic element, the sweeping range of the modulation bimetallic element is offset by a value proportional to the average energy applied to the oven so that the true and set temperatures are driven toward, and finally to, equality.

In the apparatus described in the patents mentioned hereinabove, the proportional and integral effect bimetallic elements vary the position of the set point. However, this design is physically implemented by relatively complex and fragile mechanical systems which it would be desirable to simplify.

Therefore, a still further object of the invention is to provide an uncomplicated assembly of proportional and integral effect bimetallic elements which utilize to advantage a light spot and photoelectric detecting cells.

According to this aspect of the invention, the light spot comprises a reading spot and a regulating spot. The reading spot is obtained by an aperture extending therethrough configured to shape incident light into a reading spot of desired cross-section, the mask being attached to the meter movement. The regulating spot is obtained by a regulation mask mounted on the end of a proportional effect bimetallic element. The proportional effect element is associated with an integral effect bimetallic element synchronously heated with said proportion effect element, the deflections of said elements being opposed to each other and the integral effect element having a long thermal time constant compared to the proportional effect element.

As a result of the instant arrangement of integral and proportional effect elements, the manufacture of light spot indicator-regulators possessing both effects is made particularly easy. The cells which determine the set points, after their initial positioning, need not be subsequently adjusted and the relatively complex and fragile mechanism which, up to now, has been used both for adjusting and causing oscillations at the set point is considerably simplified by separating the functions and using an adjusting mechanism for the cells and an oscillating mechanism for the regulation mask.

Figure 2:
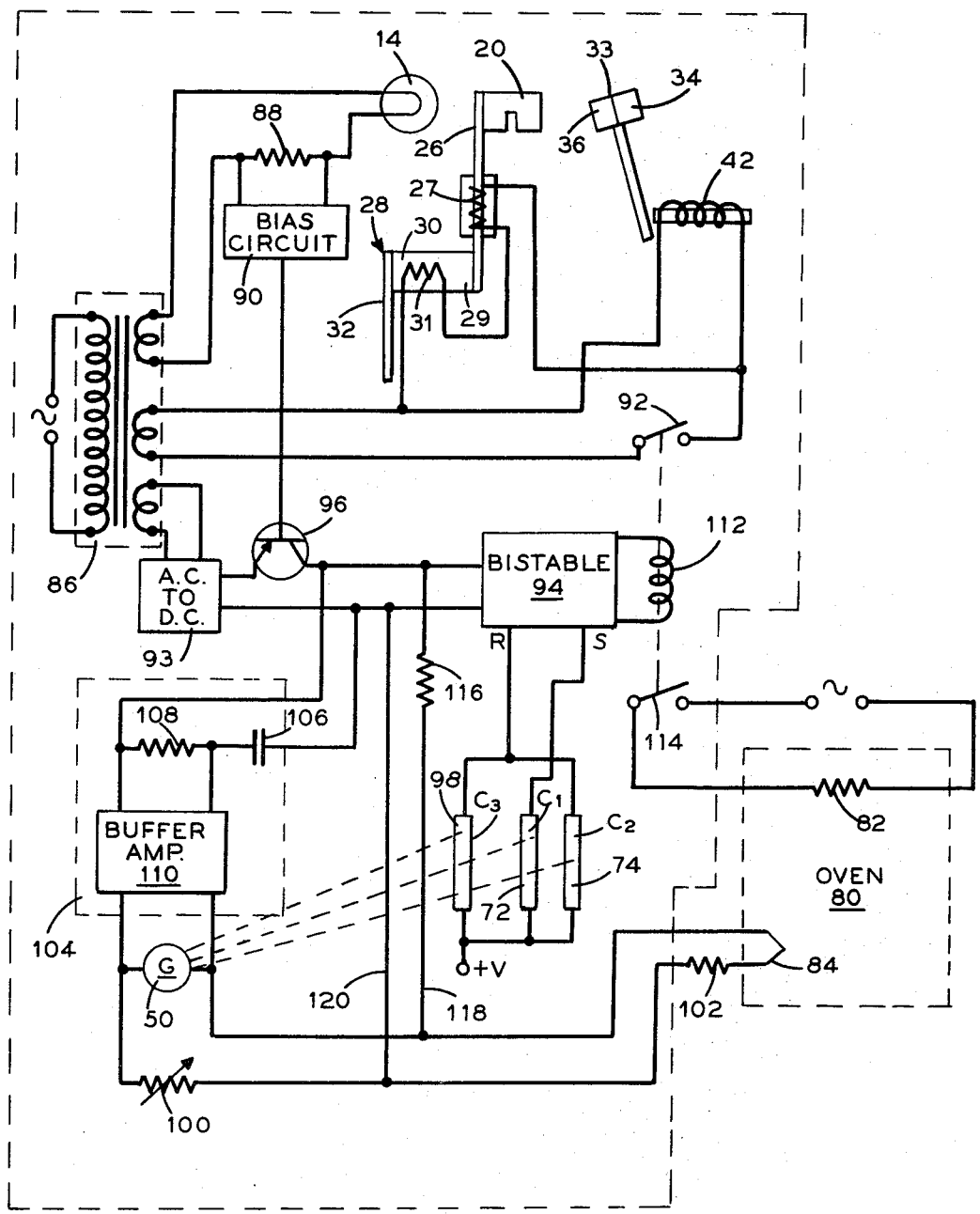

The characteristics and advantages of the invention will be further enhanced by the description to follow which is given solely as a non-limitative example with reference to the attached drawings on which:

FIG. 1 is a perspective view of a regulator-meter according to the invention showing the inner layout of the various components; and FIG. 2 is a diagram of the electrical circuits used in the meter shown in FIG. 1.

Referring to FIG. 1, a regulator-meter comprises a housing of overall rectangular shape having sidewalls 2 and a rectangular cover 4 mounted thereon. The housing front wall 6 mounts a flat translucent screen 8 inscribed with scale indicia 10 and the housing rear wall 12 mounts a incandescent lamp 14. A condensing lens 16 is mounted in front of the lamp 14 to focus visible light rays emanating from the lamp 14 onto two masks 18 and 20. Mask 18 is attached to a sidewall of housing 2 and includes a triangular-shaped aperture 22. Mask 20, located approximately in the same plane as the mask 18, has a rectangular-shaped aperture 24 extending therethrough and is mounted fixedly on the free end of a first bimetallic element 27 of overall rectangular shape and having a midlength section surrounded by a heating resistor 27. Bimetallic element 26 is attached to a spacer 28 which mounts a heat insulated plate 29 composed of asbestos, for example, and a small metal block 30 formed with a central bore in which is placed a heating resistor 31, the resistor 31 being electrically insulated from the block 30 by encapsulating in a material of relatively low heat conductivity, for example, ceramic. The block 30 is fixedly mounted to a second bimetallic element 32, similar to the element 26, and attached to the sidewall 2. The assemblies of bimetallic elements 26 and 32 are such that they deviate in opposite directions when heated. The time necessary for the bimetallic elements to be completely deflected under the effect of their respective heating resistors 27 and 31 are, for example, approximately one and five minutes respectively. Adjacent to, and in optical alignment with, the aperture 22 is a dual-color transparent filter 33, having, for example, a red filter section 34 and a green filter section 36 joined together in endwise relationship. The filter 33 is attached fixedly to a metal plate 38 which can pivot between two positions around a pivot pin 40 in directions perpendicular to the plane of filter 33. The position of the plate 38 is controlled by a solenoid 42.

The light originating from bulb 14, after having passed through lens 16, slots 22 and 24 and filter 33 strikes a planer, reflective mirror 44 inclined to incident rays of light 52 so as to reflect such light through a further condensing lens 46. Light rays 54 leaving the lens 46 are directed onto a mirror 48 mounted on the moving coil of a galvanometer 50 and form a colliminated beam of light spot 58 on the front wall 6 of housing 2. The focal distance of lens 46 is selected so as to provide a clear image of the luminous object formed by aperture 24 and triangular aperture 22. It will be noticed that the image is inverted relative to the luminous object, the triangular part 60 or indicating spot striking the translucent screen 8, and the elongated part 6, or regulating spot, impinging upon an opaque region beneath this screen, that is, on the opaque part of front surface 6. Galvanometer 50 is conventional with a moving coil 64 and magnetic parts 66. A carriage 70 may be moved along a slideway 68 parallel to front surface 6 and located immediately behind this surface, this carriage 70 having two photoelectric cells 72 and 74 mounted thereon. These two cells have the shape of two narrow, vertically oriented rectangles spaced apart a distance slightly less than the width of the regulation spot 62. A vertical axis located centrally or midway between these two cells represents the position of the set point for regulation, this axis being materialized by a pointer (not shown) attached to carriage 70 and located in front of translucent screen 8.

FIG. 2 shows the various electrical circuits of the indicator regulator shown in FIG. 1, used for example, for measuring and controlling the temperature of an electrical oven 80 heated by a resister 82. The temperature of the oven is sensed by a thermocouple 84 connected to the regulator-meter. Other temperature sensors such as resistor sensors may be used in lieu of the thermocouple 84.

The regulator-meter is supplied with A.C. current applied to a transformer 86 with three outputs. The first output is applied to the lamp 14. A resistor 88 connected in series with lamp 14 has its terminals connected to a bias circuit 90. The second output of transformer 86 is connected through a switch 92 to the heating resistors 27 and 31 connected in series. The coil of electromagnet 42 is connected in parallel to these two heating resistors 27 and 31. The third output of transformer 86 is connected to a direct current power supply 93 the output of which is connected to a bistable flip-flop 94 through a switch shown in the form of a transistor 96. The base of transistor 96 is connected to the output of bias circuit 90. Bistable 94 includes set terminal S connected to the photoelectric cell 72 and also referred to as C1, and a reset terminal R connected to the photoelectric cell 74 also referred to as C2. A third cell 98 referred to as C3, is also connected to the terminal R, the three cells being supplied with D.C. voltage from supply +V. The output signal from bistable 94 is applied to the coil 112 of an electromagnetic relay controlling a first set of contacts 114 connected in series with the oven heating circuit 82 and a second set of contacts 92, connected as described hereabove.

A relay 114 is controlled directly by the bistable 94. It is thus possible to interpose, between this bistable and the coil of relay 112, a control circuit of the type described in applicant's French patent application PV 141,329, filed Feb. 27, 1968 and entitled "an Electromagnetic Relay Control System."

The thermocouple 84 is connected for sensitivity adjustment through resister 100 to the terminals of the galvanometer 50, a resister 102 representing the lead resistances. The galvanometer 50 is also connected by means of a sweeping pulse circuit 104 to D.C. voltage delivered by supply 93, this voltage being taken off the collector of transistor 96. The sweeping pulse circuit 104 includes a differentiating circuit formed by capacitor 106 and a resistor 108 followed by a buffer-amplifier 110. The purpose of circuit 104 is to deliver to the galvanometer 50 a sweeping pulse every time the supply 93 is switched on. The reasons for generating this sweeping pulse are explained in greater detail hereafter.

The D.C. voltage produced by the supply 93 is also supplied by means of two conductors 118 and 120 to the input terminals of thermocouple 84. Conductor 118 incorporates a resistor 116 of high resistance value. The circuit formed by conductors 118 and 120 and resistor 116 cooperates with the photoelectric cell 98 to stop heating of the oven in case the thermocouple 84 is broken, as will be explained subsequently.

In operation, thermocouple 84 generates a voltage which is a function of the temperature of the oven 80 and the deviation of the galvanometer spot is proportional to this temperature. It will, firstly, be assumed that the oven is being heated and that its temperature is lower than the established set point. Luminous spot 58 is therefore to one side of the cells C1 and C2. Bistable 94 is in the active state and, therefore, closes switch 114. As the temperature of the oven increases the spot 58 moves toward the right (assuming the observator looks at the front screen 8). When the regulation spot 62 encounters cell C1 connected to the set terminal of bistable 94, nothing happens since this bistable is already in the active state. On the other hand, when spot 62 encounters cell C2, bistable 94 returns to the passive or reset state and relay 114 opens, thereby stopping the heating of the oven. Conversely, when the temperature of the oven decreases, spot 62 returns towards the left and by traversing the cell C1 triggers bistable 94 into the active state, thereby closing switch 114. When the balanced temperature of the oven is obtained, the spot lies between the two cells C1 and C2. Since the spacing between the cells is very slightly less than the width of the spot the latter are permanently sensitized and a slight movement towards the right stops the heating and a slight movement towards the left restarts this heating. The set point is, therefore, properly maintained on the central axis of the two cells C1 and C2.

In the foregoing explanation, it has been assumed, that the bistable 94 was in the active state. In fact, this bistable is designed so that its reset state is a privileged passive state characterized by a 0 bit potential level on its logical 1 output terminal and its set state as an active state characterized by a 1 bit level on its logical 1 output terminal. In this manner, if a momentary open circuit or other failure occurs in the mains or other power supply failure occurs, when the temperature of the oven is greater than the set value, the switches 92 and 114 will remain open during the period the power supply is reestablished since the bistable will then return to the passive state. If the oven is cold when the indicator regulator is switched on, the bistable, therefore, remains in the passive state and the oven does not heat up. To avoid this disadvantage, the sweeping pulse circuit 104 is provided. When the D.C. voltage delivered by the power supply 93 rises from zero volts to its normal level, the differentiating circuit formed by capacitor 106 and resistor 108 produces a well-defined pulse which is applied through buffer amplifier 110 to galvanometer 50. In response to this pulse, the spot 58 sweeps scale 10 up to maximum or full scale position and then returns to its normal operational position. During this sweeping operation, regulating spot 62 energizes, successively, cells C1 and C2 and then in reverse order C2 and C1, if the temperature of the oven is less than the said temperature. The bistable 94 successively enters the active state when the spot passes over the cell C1 and to the passive stage when the spot passes over the cell C2. On return, nothing happens when the spot passes C1; the bistable 94 returning to the active state when this spot passes over C1. This is therefore the desired heating position. This sweep happens in the same manner when a momentary power failure occurs, thereby closing switch 114 when the current is re-established if the temperature of the oven is less than the set point value.

Polarization circuit 90, resistor 88 and transistor 96 form a safety system in case of breakage of the filament of lamp 14. If this failure occurs, the difference in potential between the terminals of resistor 88 becomes null, circuit 90 no longer supplies the bias voltage to the base of transistor 96 which thereupon stops conducting. Since coil 112 is no longer supplied current switch 114 opens and terminates the heating of the oven.

When the oven 80 starts heating, the contact 92 of relay 112 closes and power is applied to heating resistors 27 and 31 of the proportional and integral effect bimetallic elements 26 and 32, respectively. The direction of deflection of the element 26 is such that mask 20, which is carried by said bimetallic element, is offset relative to the reading spot 60, which always indicates the true value of the temperature. The direction of deflection of the element 32 is opposite to that of the element 26 so that the regulation range is constantly offset by a value proportional to the average energy applied to the oven and that the true and set temperatures are identical under stable operating conditions.

It can be seen that the mechanical assembly of elements 26 and 32 is particularly simple, rugged and inexpensive. The same is true for the cells C1 and C2.

The switch 92 also controls solenoid 42 which controls the position of the two color filters 34 and 36 relatively to the opening 22. During heating of the oven, the solenoid pulls in that the green filter 36 is moved in front of the opening 22 and as a result a green reading spot 60 appears on the screen 8. Above the set value that solenoid pulls out and the filter 33 is pivoted until the red filter 34 moves in front of the opening 22 whereupon the reading spot 60 becomes red. This system makes it possible for the operator to ascertain, at a glance if and how the system is operating.

Conductors 118 and 120, resistor 116 and the third photoelectric cell 98 combine to form a safety device in case of breakage of the thermocouple 84. Cell 98 is mounted behind the front wall 6 in front of the zero of graduation 10 (FIG. 1). Without this safety system, should thermocouple 84 break, the spot would return to the mechanical zero and the oven would remain in heating position even at high temperatures. The direct current power supply, therefore, is applied to the terminals of the thermocouple through resistor 116. If thermocouple 84 is not broken, the additional voltage applied to galvanometer 50 by conductors 118 and 120 is negligible because the value of resistor 116 is very high compared to the internal resistance of thermocouple 84. The measurement, therefore, is not affected. On the other hand, if the thermocouple is defective, all the power supply voltage is applied to the galvanometer. Conductors 118 and 120 are connected in such a manner that when this voltage is applied, the spot 58 deviates towards the left. Regulation spot 62 impinges on photoelectric cell C2 which places bistable 94 in the passive state, thereby cutting the heating of oven 80. This safety system operates for low impedance sensors. If a sensor of the variable resistance type is used, this safety system can be deleted since breakage of the sensor would result in unbalance in the measuring bridge which would give a deviation of the spot towards the maximum reading of the scale, thereby stopping the heating. In this case, the cell C2 can also be placed beyond the scale number representing the maximum value of interest.

The regulator-meter although described as being used to control the temperature of an oven, could, of course, be used to regulate other types of apparatus requiring a yes or no type regulation.

What is claimed is:

1. Apparatus comprising, a viewing medium, means for directing a light beam onto said medium for viewing, means responsive to beam radiation for producing an output electrical signal, a utilization device, bistable means coupled to said means responsive to beam radiation and responsive to said output signal to change state for controlling said utilization device and means for driving said means for directing through a predetermined initial cycle to drive said bistable means into an initial, predetermined state.

2. Apparatus comprising, a light-transmitting medium, optical means drivable by a signal under measurement for projecting a beam of light onto said medium, the driving of said optical means causing said beam to sweep said medium along a path, means located at a predetermined position on said path for producing an output electrical signal in response to incident radiation from said beam, bistable means coupled to the signal-producing means and changing state in response to said output signal, means for driving said optical means with a signal of predetermined magnitude sufficient to displace said beam past said signal-producing means at least once, whereby said bistable means is caused to assume a predetermined initial state.

3. The apparatus as claimed in claim 2 wherein the signal producing means comprises, two photoelectric elements spaced apart along said path a distance slightly greater than the corresponding cross-sectional dimension of said beam, the region between said two elements defining a set point for the apparatus.

* * * * *